United States Patent [19]

Gross

[11] Patent Number: 5,088,787
[45] Date of Patent: Feb. 18, 1992

[54] AUTO WINDOW MOLDING
[75] Inventor: Michael G. Gross, Tipp City, Ohio
[73] Assignee: Creative Extruded Products, Inc., Ohio
[21] Appl. No.: 633,019
[22] Filed: Jan. 30, 1991
[51] Int. Cl.$^5$ .............................................. B60R 13/06
[52] U.S. Cl. ...................... 296/93; 296/201; 52/208
[58] Field of Search .............. 296/201, 93, 206; 52/208, 397, 400

[56] References Cited

U.S. PATENT DOCUMENTS

| | | | |
|---|---|---|---|
| 4,614,347 | 9/1986 | Kruschwitz | 52/208 X |
| 4,738,482 | 4/1988 | Böhm et al. | 296/201 X |
| 4,765,673 | 8/1988 | Frabotta et al. | 296/93 |
| 4,950,019 | 8/1990 | Gross | 296/93 |
| 5,032,444 | 7/1991 | Desir, Sr. | 296/93 X |

Primary Examiner—Robert R. Song
Attorney, Agent, or Firm—Reuben Wolk

[57] ABSTRACT

A molding for concealing the edge of an automobile window, such as the rear window or the windshield, and the adjacent body panel, and also providing a seal and closeout for an adjacent access member such as the trunk lid or the hood. The molding is comprised of a first member having a portion composed of a soft polymeric member which retains and conceals an edge of the window, and has a harder integral portion; and a second member which acts as a seal and close-out for the nearer end of the access member. The second member has a harder portion which interengages the harder portion of the first member, and a softer portion which the access member contacts to provide the seal and closeout.

20 Claims, 2 Drawing Sheets

AUTO WINDOW MOLDING

BACKGROUND OF THE INVENTION

The present invention relates to an automobile molding primarily for application to the rear window and trunk area, or the windshield and hood of the automobile. The molding has the multiple purpose of concealing the lower edge of the window which would otherwise be exposed, to provide a seal and close-out for the end of the trunk lid or hood, either of which is referred to as an "access member", which is closed on the panel portion of the body between the access member and the lower edge of the window, and to conceal the edge of the member providing the seal and close-out.

PRIOR ART STATEMENT

The conventional molding for accomplishing the above purposes is made of a single extruded part which requires complex processing. In addition, such a molding must be designed to interface the window, the body panel and the trunk lid or the hood, and it is usually very difficult to install such a part in a highly automated assembly plant. Such a part usually lacks stability in handling as well as after installation.

SUMMARY OF THE INVENTION

The present invention overcomes the deficiencies of the prior art by providing a two-piece molding which is easier to make, reduces tooling costs, is cosmetically acceptable, simplifies handling, and is easier to package and ship. The two members which comprise the novel molding provide flexibility in assembly by permitting pre-assembly or assembly at a later time. The molding consists of a first and a second member, wherein the first member grips and conceals the edge of the window and the adjacent panel, and is commonly referred to as the "reveal molding". This member is principally composed of a soft, flexible, resilient polymeric material, but has a projection made of a similar but harder polymeric material. A second member, commonly referred to as a "close-out molding", extends over the body between the access member opening and the window, and seals the access member while contacting the body panel, and is primarily made of a soft polymeric material similar to and having approximately the same hardness as the softer portion of the reveal molding. This member also has a second portion containing a recess, made of a harder polymeric material having approximatly the same hardness as the projection of the reveal molding, and the recess interengages with the projection to lock the two members together without requiring an adhesive. This makes it feasible to pre-assemble the two members, or to assemble them during final assembly of the auto. The outer portion of the first member, or reveal molding, not only conceals the edge of the window, but the harder portion of the second member, or close-out molding. Alternatively, the projection may be part of the second member and the recess part of the first member.

Each of the members is formed by a co-extrusion process so that the softer and harder members create a unitary monolithic member. Such a process, and the broad concept of inter-engaging the harder portions of two separate members, is discussed in Applicant's U.S. Pat. No. 4,950,019, issued on Aug. 21, 1990.

A further feature of the invention provides for a tri-extrusion of the reveal molding, whereby part of the member which grips the edge of the window may be made of a less expensive soft polymeric material having approximately the same hardness as the concealing portion of the member. This material may contain fillers to reduce the material cost, and may also contain other compounds which improve the adhesive bond with adjacent parts. It is also contemplated to make the outer part of the reveal molding more decorative by processing the surface, or by making it of transparent or translucent material, and imbedding a decorative strip which is visible from the exterior of the molding. If desired, a decorative strip may be applied to the exterior of the reveal molding.

By making the outer portion of the reveal molding of a soft material, it withstands high impact, such as might be imposed by the trunk lid or hood. The material must also be able to withstand the so-called "ice-scraper test" imposed by the auto manufacturer. However, it is impractical to make the entire molding of such soft material, because the interengaging parts would not hold together; hence, the advantage of making the projection and recess of harder material.

Accordingly, it is a principal object of the invention to provide an improved molding for gripping and concealing the edge of a window of an automobile, and to seal and close out the end of the access member near the window.

It is a further feature to form the molding of two members which are closely interengaged.

It is another object to produce the molding in a simple, economical manner.

It is yet another object to produce each member of the molding of different materials to serve different purposes.

Other details, features and objects of the invention will become apparent from the embodiments presented herein.

DESCRIPTION OF THE PREFERRED EMBODIMENTS

Figure 1:
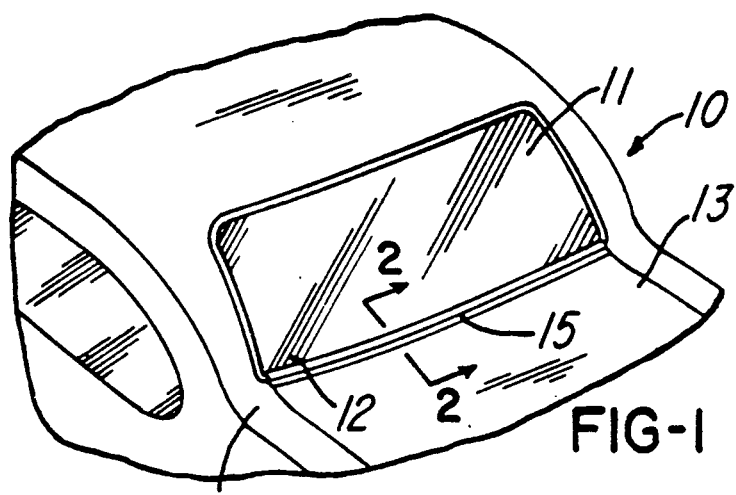
FIG. 1 is a fragmentary perspective view of a typical automobile illustrating the installation of the novel molding.
Figure 2:
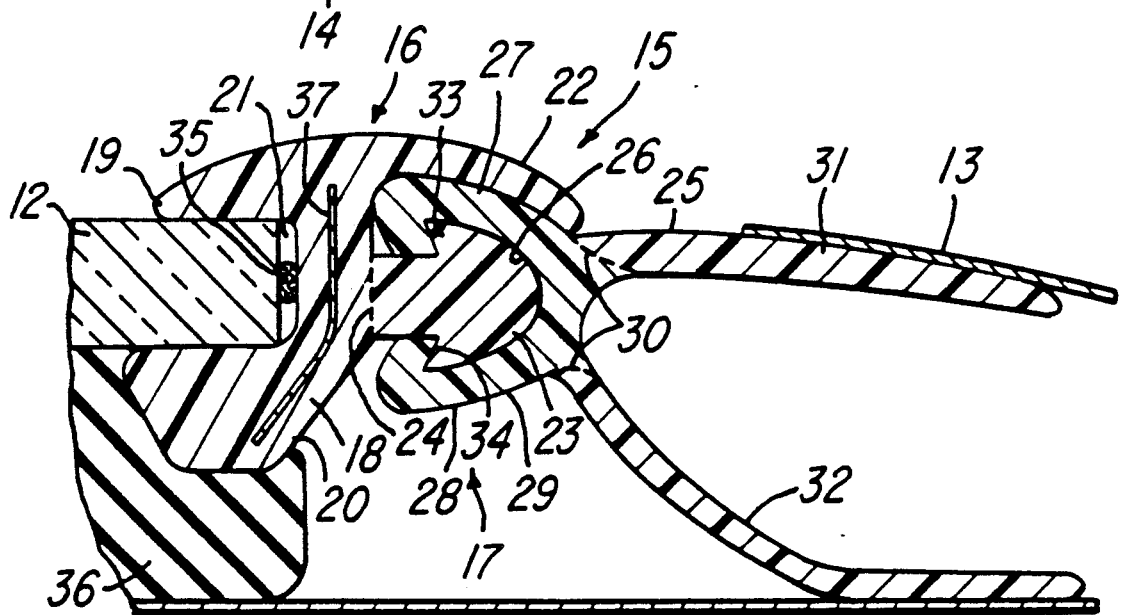
FIG. 2 is an enlarged sectional view of the novel molding, taken along line 2—2 of FIG. 1.

Exemplary forms of the invention are described below with reference to a rear auto window, and to a trunk lid which is one form of an access member. However, the novel molding may also be applied to a windshield, and to a hood which is another form of access member. FIG. 1 illustrates a portion of an auto 10 having a rear window 11 with an edge 12 adjacent a body panel 14. A trunk lid 13 is hingedly mounted on the other end of panel 14. The novel molding 15 seals the lower portion of the window, and seals and closes out the trunk lid as shown in greater detail in FIG. 2. The molding 15 consists of a first member 16 and a second member 17, both made of a suitable flexible resilient polymeric material such as polyvinyl chloride. The member 16 is formed of a first portion 18 having an upper leg 19 and a lower leg 20 forming a recess 21, the outer surface of the member having a leg 22 extending oppositely from leg 19. The portion 18 has a hardness of approximately 75 to 95 Shore A. Member 16 has a second portion 23 which is in the form of a projection made of a polymeric material which is similar to but harder than portion 18, and has a hardness of approximately 45 to 65 Shore D. The second portion is preferably co-extruded with the first portion, thus forming the member 16 as a unitary monolithic body. The junction of the first and second portions is shown by dash lines 24. The specific hardnesses of the portions within the above ranges are established as a result of the requirements of the specific applications, and are varied to achieve the desired ease of installation and retention of the members.

The member 17 is formed of a first portion 25 comprising a recess 26 defined by upper and lower segments 27 and 28. The portion 25 is made of material similar to that of portion 18 of the first member, and also has a hardness of approximately 45 to 65 Shore D, the same as portion 18. The recess 26 is formed so that the projection 23 of the first member may be interengaged therewith, the outer surface of the projection correlated with the inner surface of the recess. The exact shape of the projection 23 and the interengaging recess 26, together with the dimensions of legs 27 and 28 which form the recess, are subject to variation in order to achieve the proper interengagement. In the embodiment shown, the projection has a cross-section in the form of a rounded arrowhead with tangs 33. These tangs are reversely angled so they may interengage the channels 34 in the recess upon installation, but create a lock so the members may not be easily separated. Member 17 has a second portion 29 made of a polymeric material similar to but softer than portion 25, having a hardness of approximately 75 to 95 Shore A, approximately the same as that of softer portion 16 of the first member. The second portion may be formed by co-extruding it with the first portion, in a manner similar to the co-extrusion of the two portions of member 16, so that both portions will form a unitary monolithic member 17. The junction of the portions is shown by dash lines 30. Portion 29 comprises upper segment 31 having an outer surface which contacts the inner surface of the trunk lid 13 to form a seal and close-out therewith. Portion 29 also has a lower segment 32 having an outer surface which contacts the body portion 14.

The first member 16 retains the window edge 12 in recess 21 by applying the upper and lower legs 19 and 20 as shown. The edge is secured by use of a suitable adhesive 35 which is placed in the recess. The lower leg 20 and the window may be bonded to the panel 14 by means of a sealant 36. The upper leg 19 thus conceals the edge 12 of the window. This member may be applied at the same time the window is installed. The second member 17 is then assembled to the first member by inserting the second portion 23 of the first member into the recess 26 in the first portion 25 of the second member, the upper and lower segments 27 and 28 thus securely gripping the portion 23. The lower segment 32 of the second portion 29 of the second member is then in contact with the panel 14 to form a resilient seal and close-out. The upper segment 31 is then contacted by the trunk lid 13 to provide a further resilient seal and close-out. The sealing properties of the segments 31 and 32 are enhanced by forming them of a softer material, in the same manner as the legs 19 and 20 of the first member. The interlocking effect between portions 23 and 26 of the two members is improved by the hardness thereof, relative to the hardness of the other portions and is maintained by the correlation of the outer surface of the projection and the inner surface of the recess, wherein the tangs 33 interlock with channels 34.

If desired, the member 16 may be reinforced by incorporating a stabilizer 37 located within the portion 18 of the member. This stabilizer is preferably extruded into the member at the same time the member is extruded. The stabilizer is in the form of a continuous strip of metal, woven fabric, or the like, and may be formed to provided additional reinforcement to the member.

Figure 3:
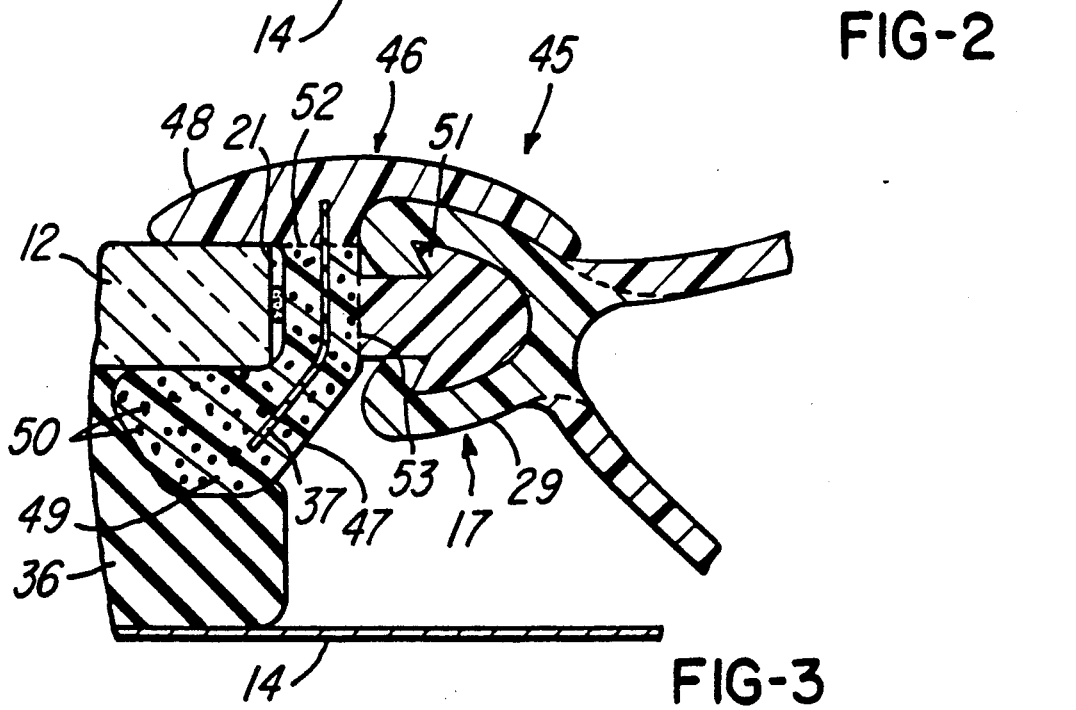
FIG. 3 is a view similar to FIG. 2, illustrating a modified form of the invention.
Figure 4:
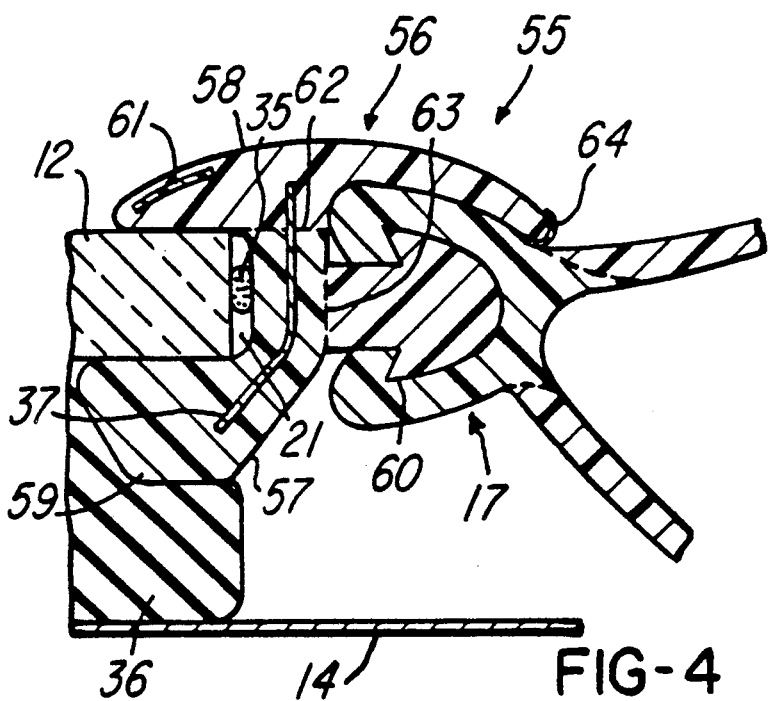
FIG. 4 is a view similar to FIGS. 2 and 3, illustrating further modified features of the invention.

FIG. 3 illustrates a modified form of the invention, in which the molding 45 is similar to molding 15 except that in the first member 46 (similar to member 16), the first portion 47 (similar to portion 18) is formed of two segments. The first segment 48 is made of a material similar to portion 18, and the second segment 49, comprising the larger part of the portion, is composed of a material similar to that of segment 47, but in addition contains particulate material 50 such as silica or fibers which act as fillers, thus providing less expensive material. The fillers may also include primers which are compatible with the sealant 36 and therefore improve the bond therewith. The portion 51 is similar to and has the same hardness and function as portion 23. In this modification, the segments 48 and 49 and the portion 51 are tri-extruded to form a unitary monolithic body, the junction lines being designated by reference numbers 52 and 53. As in FIG. 2, a stabilizer 37 may be incorporated within segments 48 and 49. FIG. 4 illustrates a further modification, in which the molding 55 is similar to molding 45 except that the first member 56 has a first portion 57 which is formed of a first segment 58 made of a polymeric material similar to segment 48, except that it is transparent or translucent for decorative reasons. A second segment 59 may either be similar to portion 18 or to segment 49. The portion 60 is similar to portions 23 and 51 and serves the same function. A strip of decorative material 61, such as a bright Mylar, is extruded within the segment 57 and below the surface 64, at the same time as parts 58, 59 and 60, so that all parts become part of the unitary monolithic body. This strip may be of any length desired, such as shown in FIG. 4, or may extend across a greater extent of the upper part of the first segment 57. The junction lines between adjacent parts are designated by 62 and 63. The result is a molding having a decorative effect because the strip 61 is visible through surface 64. The stabilizer 37 may optionally be incorporated within segments 58 and 59.

Another decorative effect may be provided either by itself or in combination with strip 61, by placing another Mylar strip 64 on one end of member 56 as shown. This strip 64 may cover only the end as shown, or may be placed over a larger part of the surface, or over the entire surface thereof. It should be understood that this strip 64 may not only be used in this modification, but may be used on the surface of the member 16 of FIG. 2 or member 46 of FIG. 3.

Figure 5:
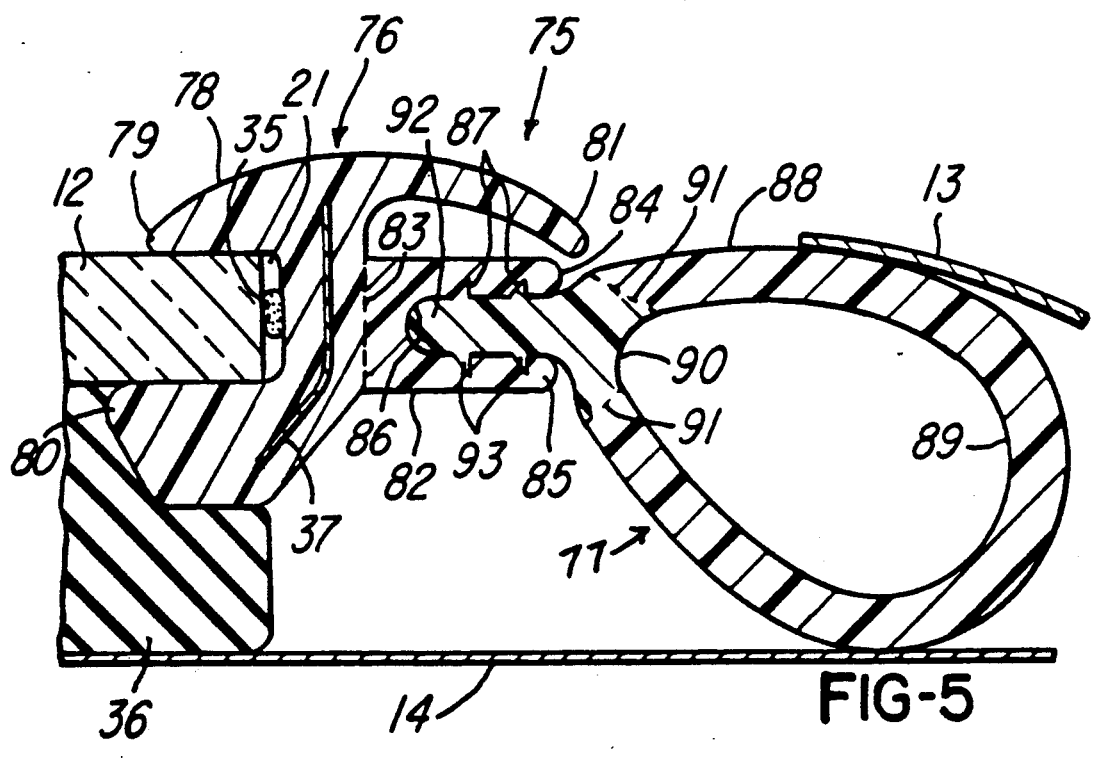
FIG. 5 is a view similar to FIGS. 2, 3 and 4, illustrating another modified form of the invention.

FIG. 5 illustrates another form of the molding which is similar to the other forms except that the interengaging portions are reversed. Molding 75 consists of first member 76, which is the reveal molding, and second member 77, which is the close-out molding. Member 76 comprises a first portion 78 having legs 79 and 80, this portion 78 having the same hardness as portion 18, for retaining window edge 12. Upper leg 79 extends to leg 81. Member 76 has a second portion 82 having the same hardness as portion 23, and is therefore harder than portion 78. Portions 78 and 82 are co-extruded as described above to form a unitary monolithic body, the junction being designated by dash line 83. The portion 82 has legs 84 and 85 defining a recess 86 having grooves 87, the exact number and dimensions of the grooves being variable in accordance with the desired locking force.

Second member 77 has a first portion 88 having the same hardness as portion 78, and has a close-out segment 89 which is hollow and continuous and generally circular in cross-section. This segment may also be used on the molding described in FIGS. 2, 3, or 4. Also, in lieu of segment 89, two segments such as 31 and 32 could be utilized here. The second portion 90 has the same hardness as portion 82, and is co-extruded with portion 88 to form a unitary monolithic body, the junction designated by dash lines 91. The portion 90 has a projection 92 with tangs 93. Thus the projection 92 and recess 86 become interengaging members with locking accentuated by interengaging tangs 93 and grooves 87. The operation of this molding is the same as that of the other forms described above.

Other modifications are also contemplated; for example, the surfaces of any of the portions 18, 47, 57 or 67 may have special colors, may have special glosses, or have special markings such as striations or patterns impressed thereon.

The specific forms of the invention illustrated and described herein are merely exemplary, and other forms are within the spirit of the invention.

I claim:

1. In an automobile having a body panel, a window adjacent one end of said panel, an access member mounted adjacent the other end of said panel and a molding for sealing and closing out said window and said access member; the improvement wherein said molding comprises first and second members, said first member retaining an edge of said window and concealing the space between said window edge and said panel, and said second member providing a seal and close-out between said access member and said panel, said first and second members having mutually interengaging means to lock said members together.

2. The molding of claim 1 wherein said first member conceals said interengaging portion of said second member.

3. The molding of claim 1 wherein said members are flexible and resilient and composed of polymeric material.

4. The molding of claim 3 wherein said mutually interengaging means comprises a recess having an inner surface and located in one of said members and a projection having an outer surface located on the other of said members, said outer surface of said projection correlated with said inner surface of said recess.

5. The molding of claim 1 wherein said first member has a stabilizing means located therein.

6. The molding of claim 1 wherein said first portion of said second member includes a segment having a generally circular hollow cross-section for providing said seal and close-out.

7. The molding of claim 1 further comprising a decorative material on the outer surface of said first member.

8. The molding of claim 4 wherein said first member is a unitary monolithic body comprising a first portion retaining said window edge and a second portion comprising one of said interengaging means, said second portion being harder than said first portion; and said second member is a unitary monolithic body comprising a first portion between said access member and said panel and a second portion comprising the other of said interengaging means, said second portion being harder than said first portion of said second member and having approximately the same hardness as said second portion of said first member.

9. The molding of claim 8 wherein said first portions of said first and second members have a hardness of approximately 75 to 95 Shore A, and said second portions of said first and second members have a hardness of approximately 45 to 65 Shore D.

10. The molding of claim 8 wherein said first portion of said first member comprises first and second segments each having approximately the same hardness, one of said segments containing particulate materials.

11. The molding of claim 8 wherein said first portion of said first member comprises first and second segments having approximately the same hardness, said first segment being transparent or translucent.

12. The molding of claim 11 further comprising a decorative strip incorporated within and visible in said first segment.

13. In an automobile body having a body panel, a window adjacent one end of said panel, and an access member mounted adjacent the other end of said panel; the improved method of sealing and closing out said window and said access member comprising the steps of forming a first member for retaining an edge of said window and concealing the space between said window edge and said panel, forming a second member for providing a seal and close-out between said access member and said panel, and interengaging said first and second members to lock said members together.

14. The method of claim 13 comprising the steps of forming a recess in one of said members and forming a projection in the other of said members to provide said interengaging step.

15. The method of claim 14 comprising the steps of correlating the outer surface of said projection with the inner surface of said recess.

16. The method of claim 13 wherein said step of forming said first member further comprises the steps of forming a first portion of a polymeric material for retaining said window edge and forming a second portion as one of said interengaging means and composed of a polymeric material which is similar to but harder than the material of said first portion; said step of forming said second member comprises forming a first portion of a polymeric material for providing said seal and close-out between said access member and said panel and forming a second portion as the other of said interengaging means composed of a polymeric material which is similar to but harder than the material of said first portion of said second member and has approximately the same hardness as said second portion of said first member; and said interengaging step comprises interlocking said interengaging means.

17. The method of claim 16 wherein said step of forming said first portion of said first member further comprises the steps of forming first and second segments each having approximately the same hardness, and incorporating particulate material in said second segment.

18. The method of claim 16 wherein said step of forming said first portion of said first member further comprises the steps of forming first and second segments each having approximately the same hardness, and forming said first segment of transparent or translucent material.

19. The method of claim 18 comprising the further step of incorporating a decorative material within said first member.

20. The method of claim 13 comprising the further step of applying a decorative material on the outer surface of said first member.

* * * * *